US011332209B2

(12) United States Patent
Fukuhara et al.

(10) Patent No.: US 11,332,209 B2
(45) Date of Patent: May 17, 2022

(54) ROBOT SYSTEM AND WORK LINE INCLUDING THE SAME

(71) Applicant: KAWASAKI JUKOGYO KABUSHIKI KAISHA, Kobe (JP)

(72) Inventors: Kazumi Fukuhara, Akashi (JP); Hitoshi Nariai, Nishinomiya (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 129 days.

(21) Appl. No.: 16/608,317

(22) PCT Filed: Apr. 24, 2018

(86) PCT No.: PCT/JP2018/016567
§ 371 (c)(1),
(2) Date: Oct. 25, 2019

(87) PCT Pub. No.: WO2018/199073
PCT Pub. Date: Nov. 1, 2018

(65) Prior Publication Data
US 2020/0339205 A1 Oct. 29, 2020

(30) Foreign Application Priority Data
Apr. 25, 2017 (JP) .............................. JP2017-086363

(51) Int. Cl.
*B62D 65/18* (2006.01)
*B23P 21/00* (2006.01)
*B62D 65/00* (2006.01)

(52) U.S. Cl.
CPC ............ *B62D 65/18* (2013.01); *B23P 21/004* (2013.01); *B62D 65/005* (2013.01)

(58) Field of Classification Search
CPC .... B62D 65/18; B62D 65/005; B62D 65/022; B23P 21/004; G05B 19/402; B65G 47/24; B25J 9/0084; B23K 37/04
See application file for complete search history.

(56) References Cited

U.S. PATENT DOCUMENTS

| 2002/0124377 A1* | 9/2002 | Nakamura | ............ B62D 65/02 29/430 |
| 2005/0060862 A1* | 3/2005 | Baulier | .................. B23K 37/04 29/429 |

(Continued)

FOREIGN PATENT DOCUMENTS

| CN | 206047477 U | 3/2017 |
| JP | S63-85384 U | 6/1988 |

(Continued)

OTHER PUBLICATIONS

Jun. 19, 2018 International Search Report issued in International Patent Application No. PCT/JP2018/016567.

*Primary Examiner* — Lee A Holly
(74) *Attorney, Agent, or Firm* — Oliff PLC

(57) ABSTRACT

A robot system has at least one robot that performs predetermined work on at least first and second work portions among a plurality of work portions, and a plurality of locators each having a locate pin movable in three axial directions orthogonal to one another, and that position the workpiece with the locate pins being inserted into the holes at a first position where the robot performs work on the first work portion, and a control device that controls operation of the plurality of locators, in which after the work of the robot on the first work portion is completed, the control device controls the plurality of locators while keeping a state that the locate pins are inserted into the holes, so as to change a (Continued)

Positioning to first position

Positioning to second position position of the workpiece from the first position to a second position where the robot performs work on the second work portion.

8 Claims, 8 Drawing Sheets

(56) References Cited

U.S. PATENT DOCUMENTS

| | | | | |
|---|---|---|---|---|
| 2008/0000068 A1* | 1/2008 | Savoy | ................... | B23P 21/004 |
| | | | | 29/429 |
| 2013/0062158 A1* | 3/2013 | Stadler | ................... | B65G 47/24 |
| | | | | 198/340 |
| 2015/0118003 A1* | 4/2015 | Bacalia | ................. | B25J 9/0084 |
| | | | | 414/771 |
| 2017/0052534 A1* | 2/2017 | Ghanem | ............. | G05B 19/402 |

FOREIGN PATENT DOCUMENTS

| | | |
|---|---|---|
| JP | H03-60943 A | 3/1991 |
| JP | 2002-274451 A | 9/2002 |
| JP | 2008-207735 A | 9/2008 |

* cited by examiner

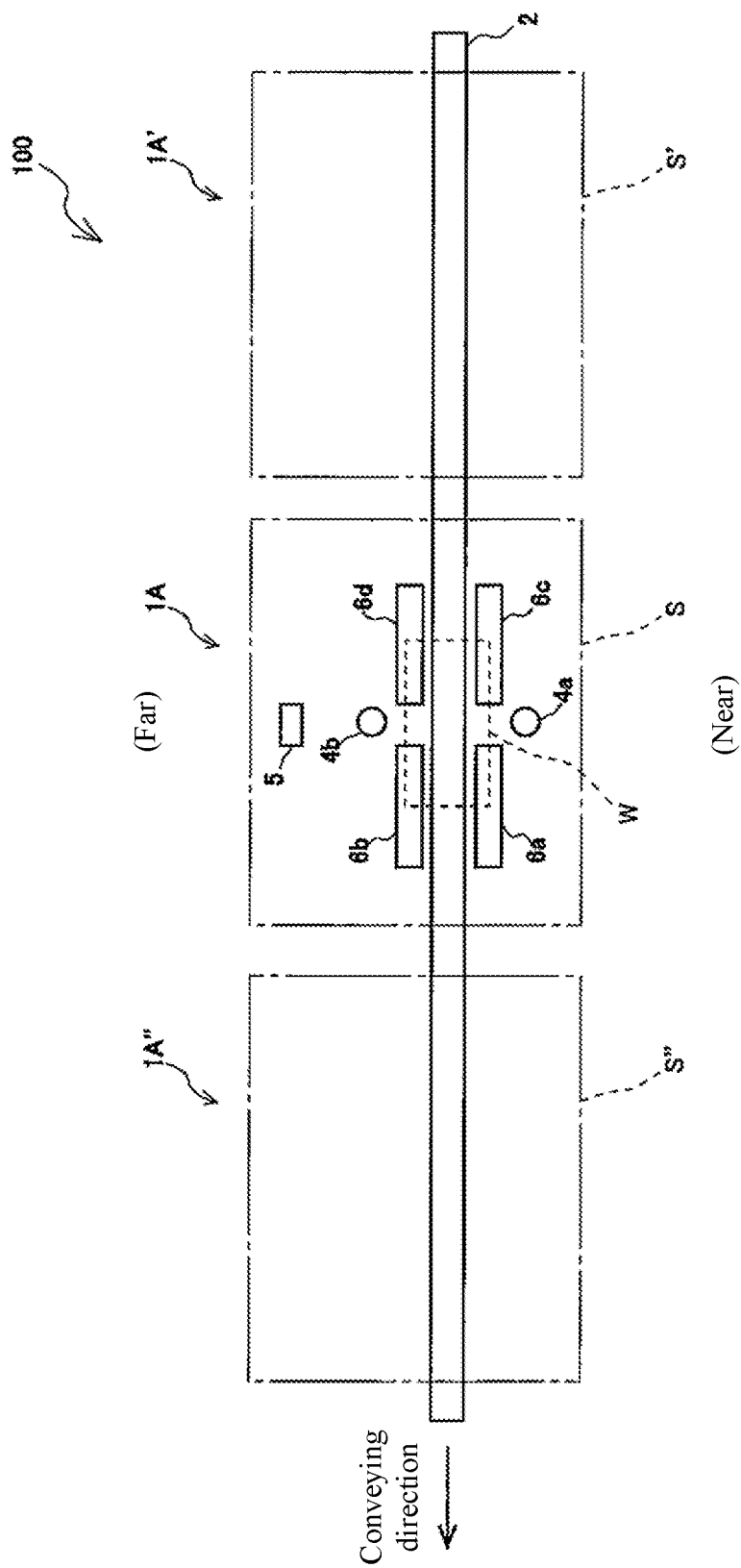

[Fig. 2]
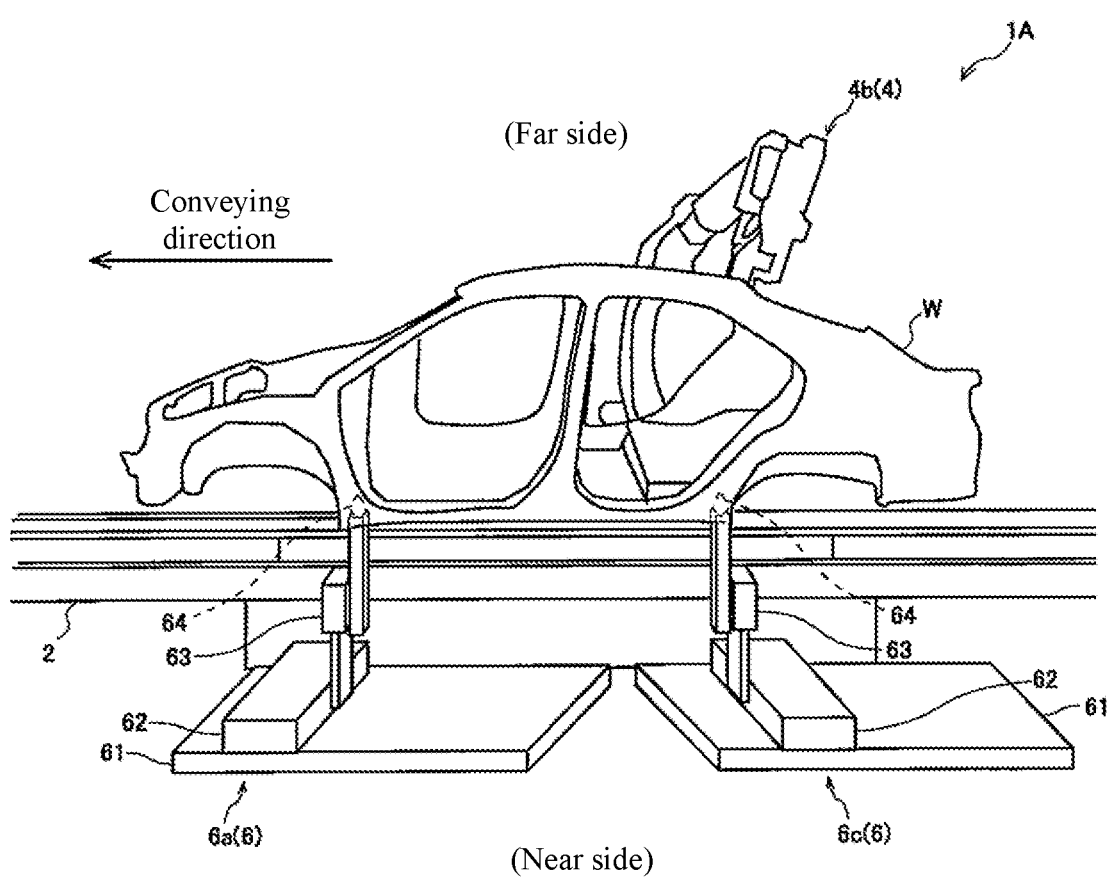

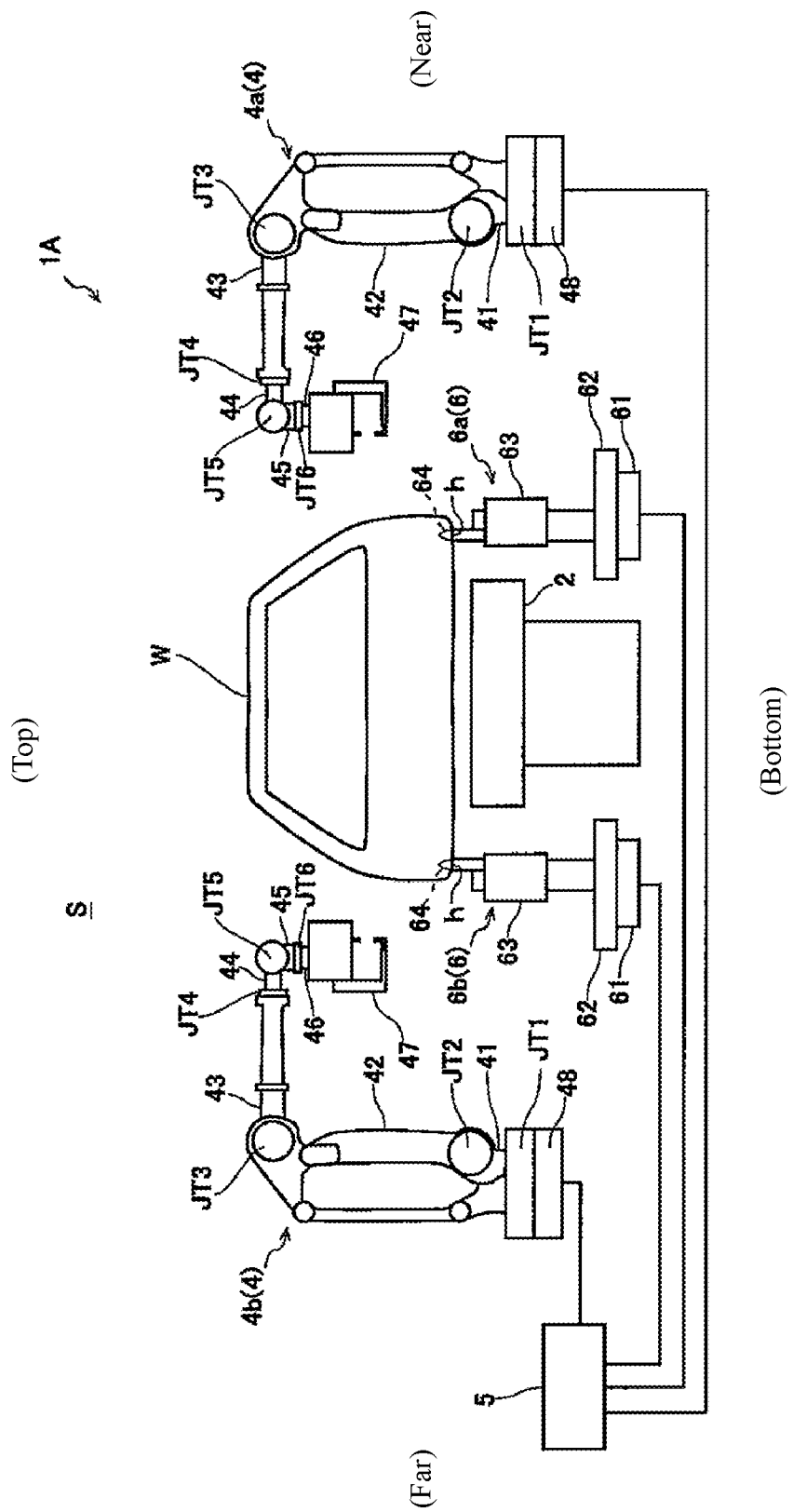
[Fig. 3]

[Fig. 4A]
Just after conveying to work stage s
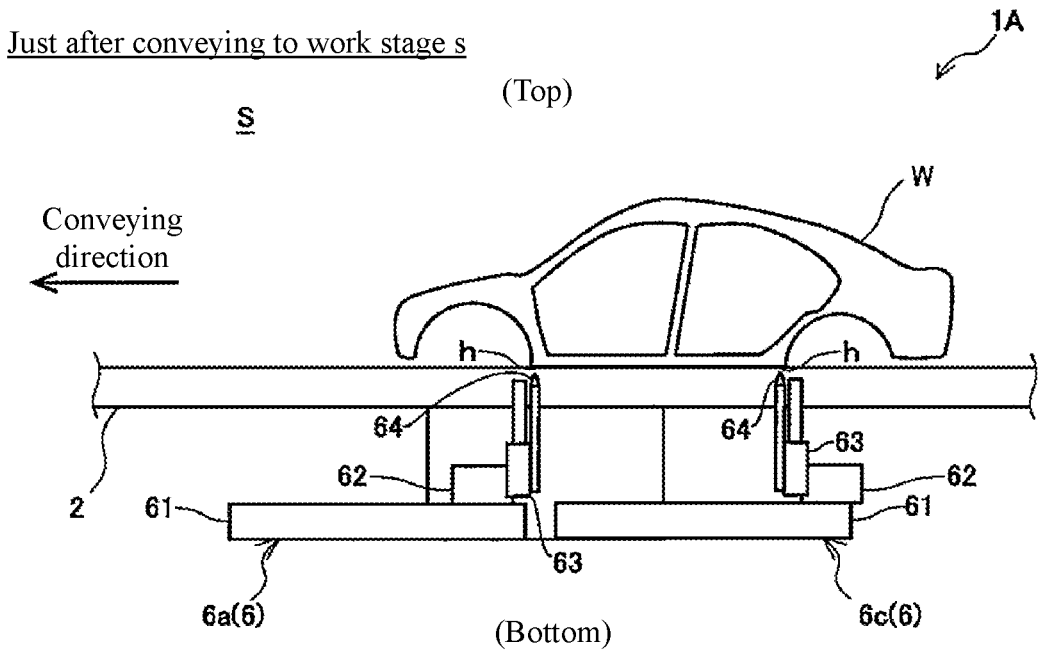
[Fig. 4B]
Just after conveying to work stage s
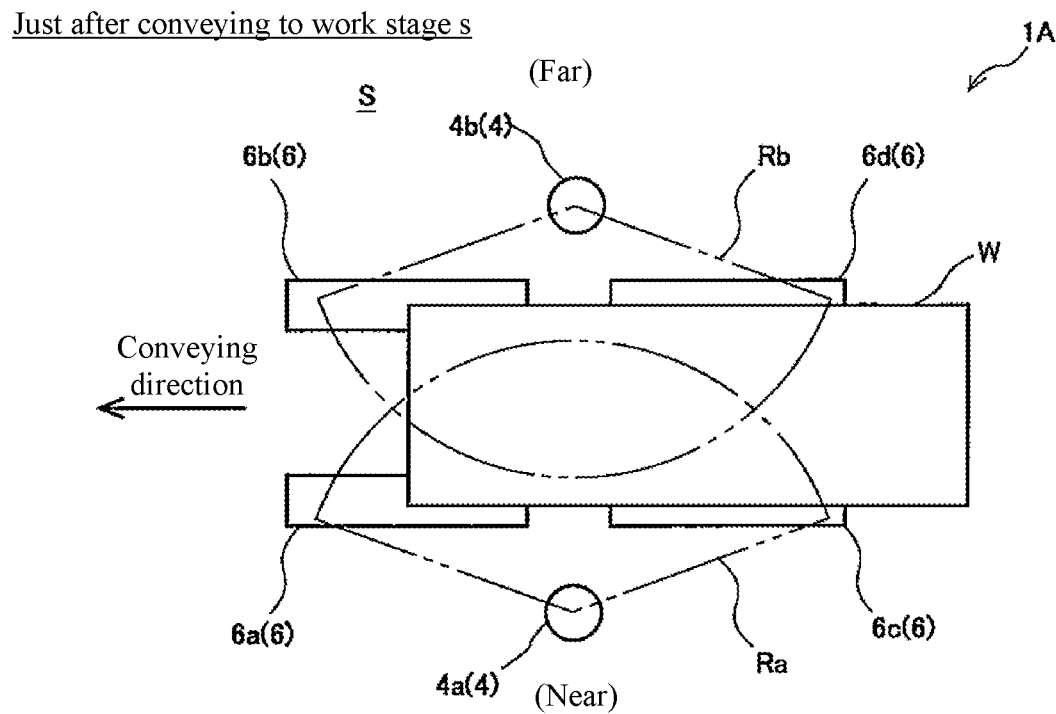

[Fig. 5A]
Positioning to first position
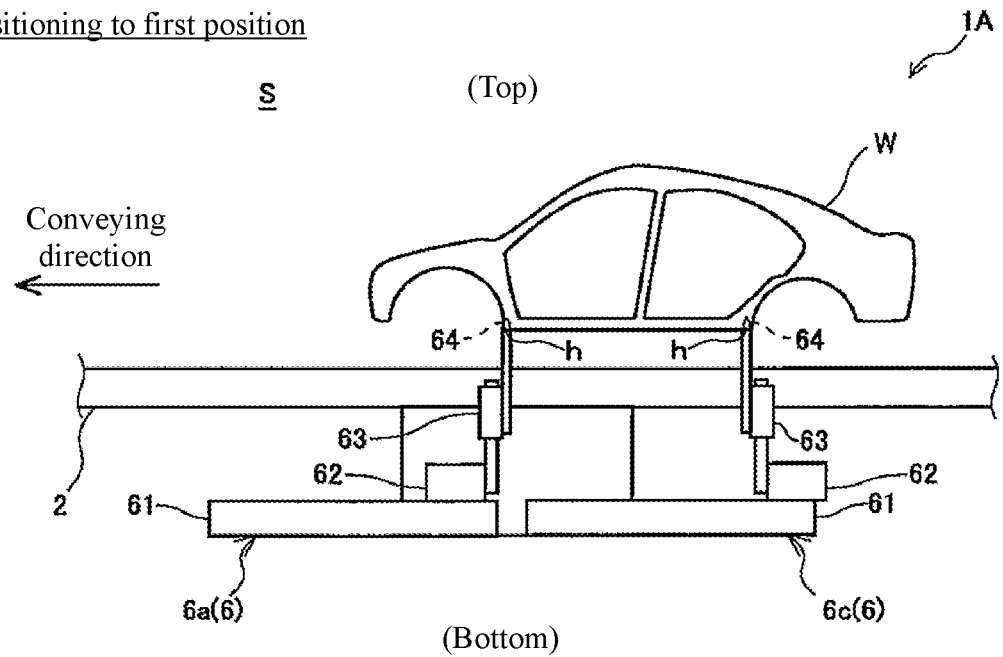
[Fig. 5B]
Positioning to first position
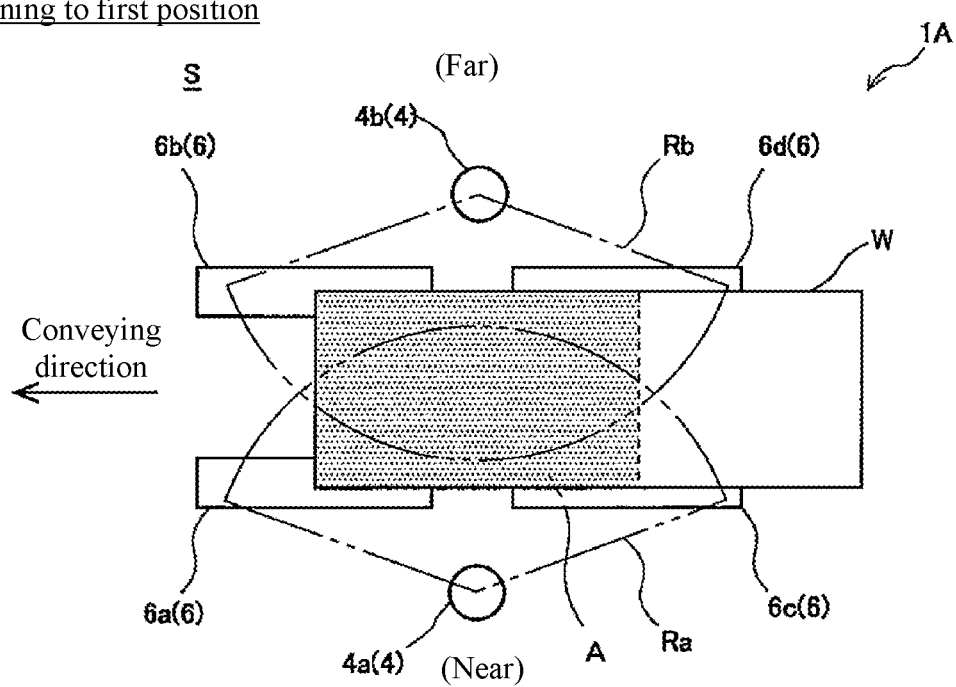

[Fig. 6A]
Positioning to second position
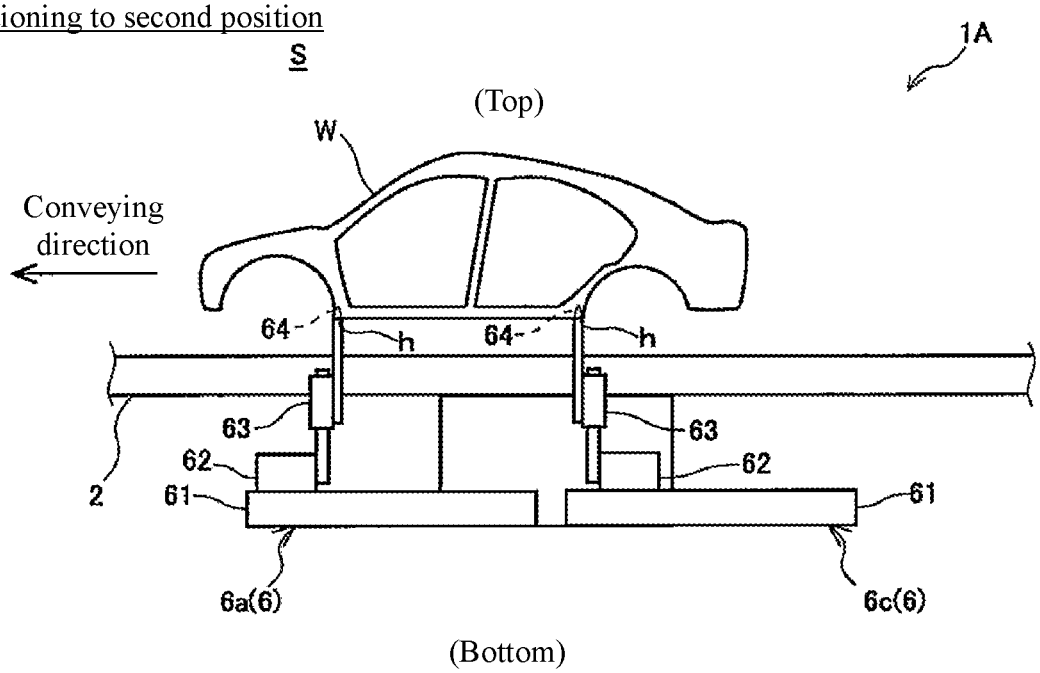
[Fig. 6B]
Positioning to second position

[Fig. 7A]
Positioning to first position
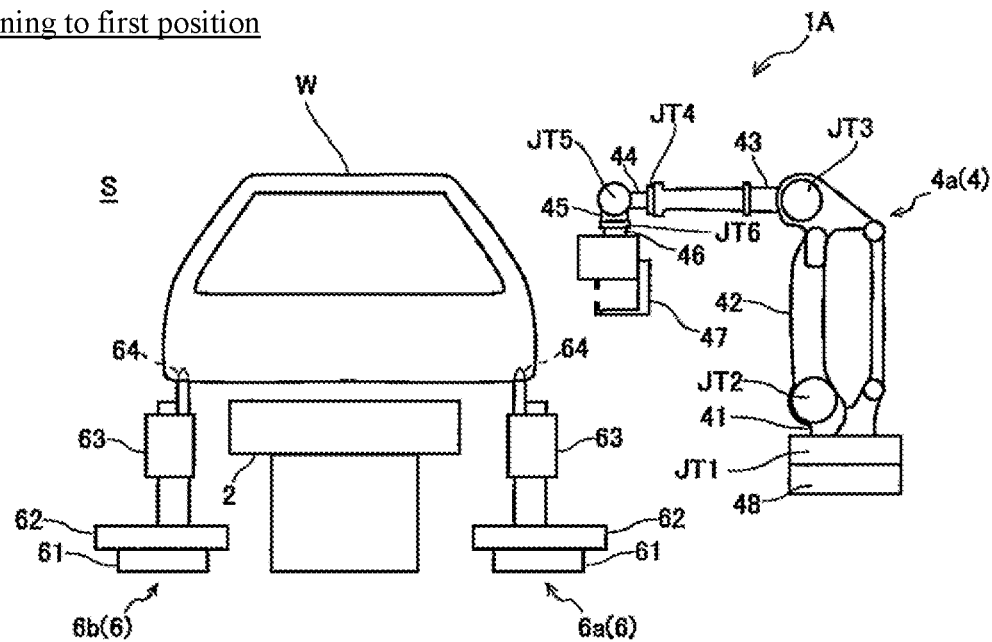
[Fig. 7B]
Positioning to second position
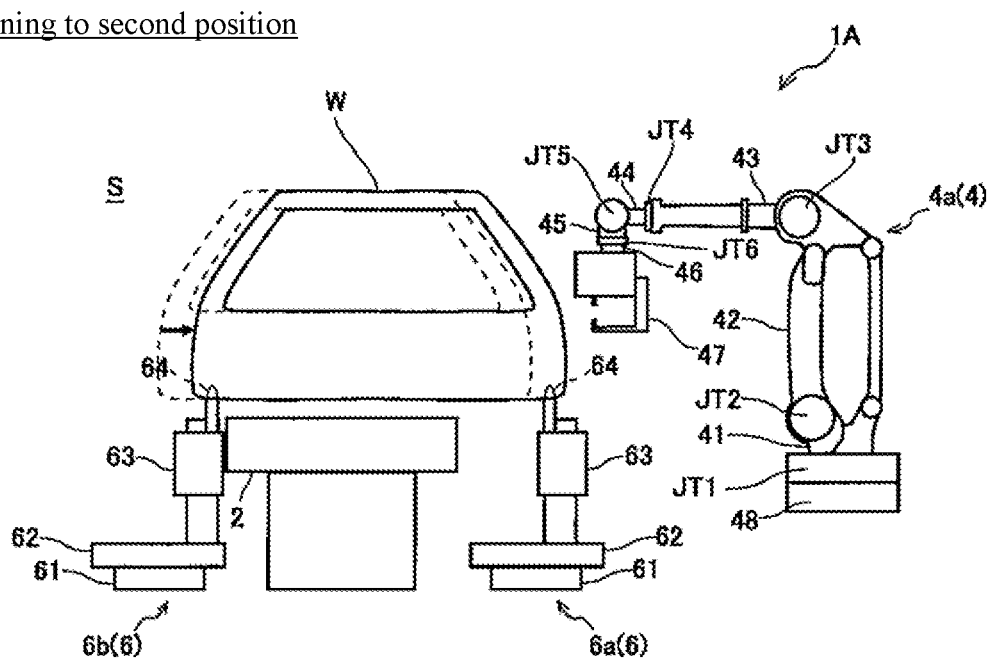

[Fig. 8A]
Positioning to first position
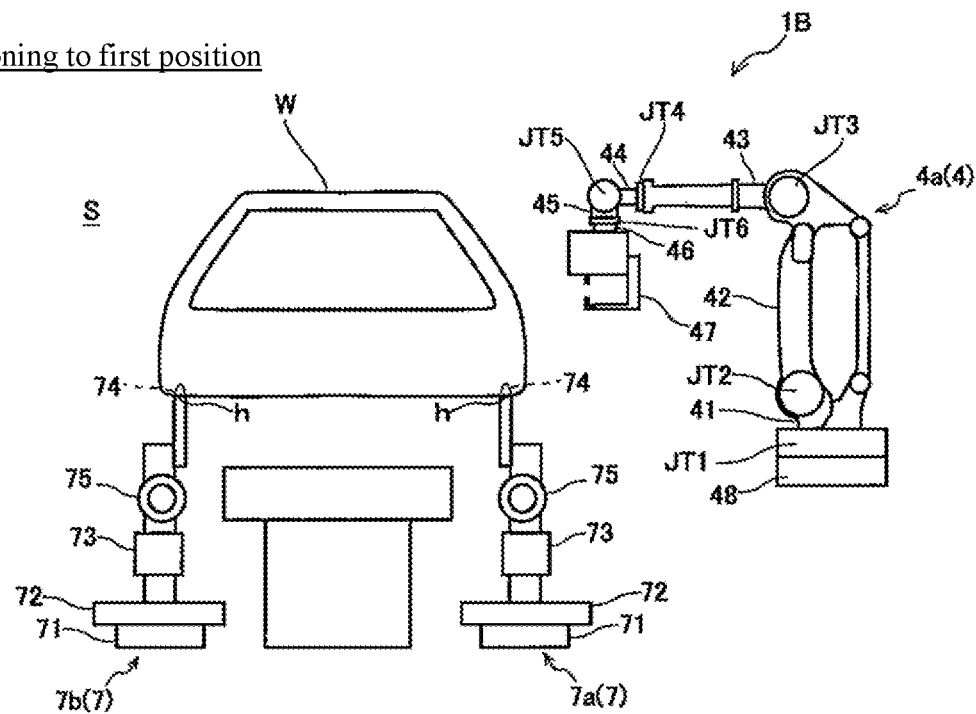
[Fig. 8B]
Positioning to second position
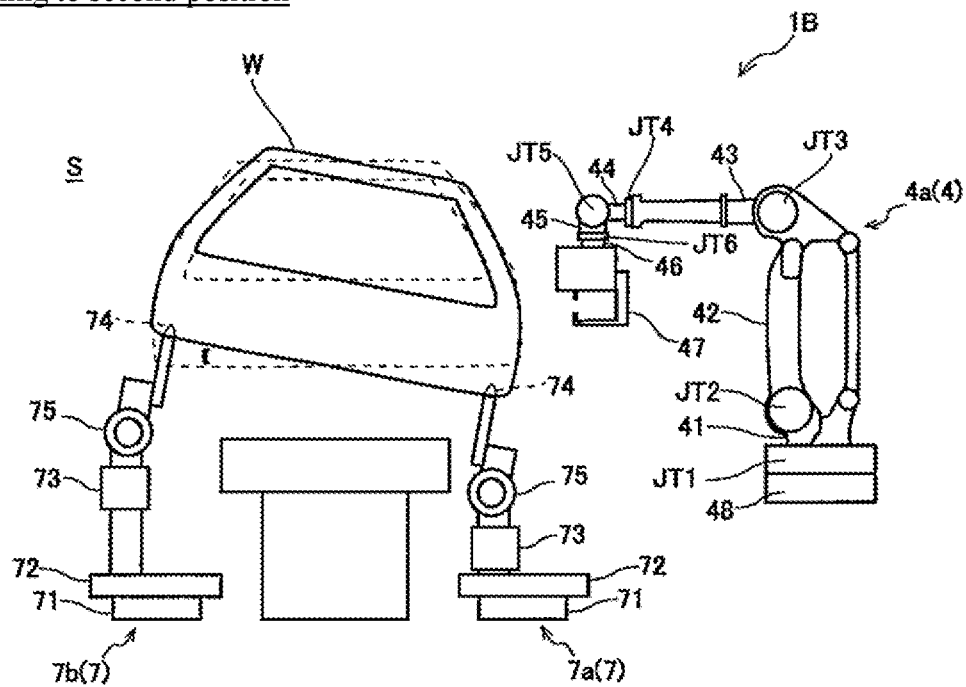

ROBOT SYSTEM AND WORK LINE INCLUDING THE SAME

TECHNICAL FIELD

The present invention relates to a robot system that performs work on a workpiece such as a vehicle body of an automobile and a work line including the same.

BACKGROUND ART

Conventionally, a plurality of work stages are provided along a line, for example, in a work line such as a vehicle body assembly line of an automobile, and a workpiece is conveyed by a conveying apparatus between the work stages. At each work stage, a locator for positioning a conveyed workpiece is disposed, and various types of work such as welding and painting by robots are performed on the workpiece positioned by the locator.

For example, PTL 1 discloses a vehicle body assembly line including a plurality of welding stages and using a skid to convey a vehicle body as a workpiece between respective welding stages. At a welding stage of this vehicle body assembly line, a positioning device provided with locate pins at a distal end thereof and one or more welding robots are disposed. The vehicle body conveyed to an assembly work stage by the skid is positioned while being lifted up to a predetermined level from the skid by the locator. Then, when positioning is completed, spot welding is performed on the positioned vehicle body by the welding robots.

CITATION LIST

Patent Literature

PTL 1: JP 2002-274451 A

SUMMARY OF INVENTION

Technical Problem

Incidentally, the workpiece generally has a plurality of work portions (for example, a plurality of joining portions to be spot-welded, and the like) to be worked by a robot. The robot can only perform work on a work portion located within a movable range of the robot among a plurality of work portions of the workpiece. In addition, even when the work portion is located within the movable range, depending on the shape of the workpiece, and the like, a part of the workpiece disposed between the robot and the work portion may become a barrier against the robot, and work cannot be performed thereon. As described above, since the work portion where one robot can perform work is limited, in order to complete the work for all the work portions, it is necessary to install a large number of robots corresponding to the positions of the work portions. However, for example, from the viewpoint of installation space, cost, and the like, there may be a need for a work line in which work can be completed with as few robots as possible.

Accordingly, it is an object of the present invention to provide a robot system capable of completing work with fewer robots for a workpiece having a plurality of work portions, and a work line including the robot system.

Solution to Problem

A robot system according to an aspect of the present invention is a robot system for performing work on a workpiece having a plurality of holes and a plurality of work portions, the robot system including at least one robot that performs predetermined work on at least first and second work portions among the plurality of work portions, a plurality of locators each having a locate pin movable in three axial directions orthogonal to one another, and that position the workpiece with the locate pins being inserted into the holes at a first position where the robot performs work on the first work portion, and a control device that controls operation of the plurality of locators, in which after the work of the robot on the first work portion is completed, the control device controls the plurality of locators while keeping a state that the locate pins are inserted into the holes, so as to change a position of the workpiece from the first position to a second position where the robot performs work on the second work portion.

With the above configuration, after work of the robot on the first work portion is completed for the workpiece having the first and second work portions, the locator changes the position of the workpiece to a position for performing work on the second work portion. Thus, for example, even when the robot cannot perform work on the second work portion when the workpiece is at the first position, it is possible for the robot to perform work on the second work portion. Therefore, since the same robot can perform work on the first and second work portions, work can be completed by a smaller number of robots for the workpiece having a plurality of work portions.

In the above robot system, the locators may each include a first moving module that moves the locate pin in a first horizontal direction, a second moving module that moves the locate pin in a second horizontal direction orthogonal to the first horizontal direction, and a third moving module that moves the locate pin in a vertical direction, in which the control device may control at least one of the first moving module, the second moving module or the third moving module, so as to change the position of the workpiece from the first position to the second position.

In the above robot system, for example, by the plurality of locators changing the position of the workpiece from the first position to the second position, the second work portion moves from outside a movable range of the robot to within the movable range of the robot.

In the above robot system, for example, by the plurality of locators changing the position of the workpiece from the first position to the second position, the second work portion moves from a position where work using the robot is not possible due to interference with the workpiece to a position where the robot can work without interfering with the work.

In the above robot system, the plurality of locators may each include a turning mechanism that turns the locate pin about a predetermined axis extending in a horizontal direction, and the control device may control the turning mechanism to tilt the workpiece, so as to change the position of the workpiece from the first position to the second position.

In the above robot system, for example, the workpiece is a vehicle body of an automobile having a plurality of joining portions as the plurality of work portions or a part constituting a portion of the vehicle body, and the robot is a robot that performs joining on the first and second work portions.

A work line according to one aspect of the present invention is a work line provided with a plurality of work stages where predetermined work is performed on a workpiece along a conveying path of the workpiece, in which the workpiece has first and second work portions, and the work line includes any one of the above robot systems disposed in at least one of the plurality of work stages, and a conveying apparatus that conveys the workpiece between two work stages adjacent to each other of the plurality of work stages.

Advantageous Effects of Invention

According to the present invention, it is possible to provide a robot system capable of completing work with fewer robots for a workpiece having a plurality of work portions, and a work line including the robot system.

BRIEF DESCRIPTION OF DRAWING

FIG. 1 is a schematic plan view of a work line according to Embodiment 1.

FIG. 2 is a perspective view of a robot system according to Embodiment 1.

FIG. 3 is a schematic side view of the robot system according to Embodiment 1 as viewed from a downstream side in a conveying direction of a workpiece.

FIG. 4A is a view for explaining an operation example of the robot system according to Embodiment 1, and is a schematic side view of the robot system immediately after the workpiece is conveyed to a work stage.

FIG. 4B is a schematic plan view of the robot system illustrated in FIG. 4A.

FIG. 5A is a view for explaining an operation example of the robot system according to Embodiment 1, and is a schematic side view of the robot system in which the workpiece is positioned at a first position.

FIG. 5B is a schematic plan view of the robot system illustrated in FIG. 5A.

FIG. 6A is a view for explaining an operation example of the robot system according to Embodiment 1, and is a schematic side view of the robot system in which the workpiece is positioned at a second position.

FIG. 6B is a schematic plan view of the robot system illustrated in FIG. 6A.

FIG. 7A is a view for explaining an operation example different from the operation example of the robot system according to Embodiment 1, and is a schematic side view of the robot system in which the workpiece is positioned at a first position as viewed from the downstream side in the conveying direction of the workpiece.

FIG. 7B is a view for explaining an operation example of the robot system illustrated in FIG. 7A, and is a schematic side view of the robot system in which the workpiece is positioned at a second position as viewed from the downstream side in the conveying direction of the workpiece.

FIG. 8A is a view for explaining an operation example of a robot system according to Embodiment 2, and is a schematic side view of the robot system in which the workpiece is positioned at a first position as viewed from the downstream side in the conveying direction of the workpiece.

FIG. 8B is a view for explaining an operation example of the robot system illustrated in FIG. 8A, and is a schematic side view of the robot system in which the workpiece is positioned at a second position as viewed from the downstream side in the conveying direction of the workpiece.

DESCRIPTION OF EMBODIMENTS

Embodiment 1

Hereinafter, Embodiment 1 of the present invention will be described with reference to the drawings. Note that in the following, the same or corresponding elements are denoted by the same reference numerals throughout all the drawings, and a redundant description will be omitted.

(Configuration of Work Line)

FIG. 1 is a schematic plan view of a work line 100 according to Embodiment 1. The work line 100 according to the present embodiment is a workpiece conveying system that performs work on the workpiece while conveying the workpiece, and is, for example, a vehicle body assembly line for assembling a vehicle body of an automobile. Hereinafter, a body of a vehicle body conveyed in the work line 100 or a part such as a frame that constitutes a portion thereof will be referred to as a workpiece W. Further, in the work line 100, the workpiece W will be described as being conveyed from a right side of the view of FIG. 1 to a left side of the view. For convenience, a lower side of the view of FIG. 1 will be described as a front side, and an upper side of the view of FIG. 1 will be described as a far side.

The work line 100 is provided with a plurality of work stages (work areas) S, S', S" in which predetermined work is performed on the workpiece W along a conveying path of the workpiece W. Robot systems 1A, 1A', 1A" for performing work on the workpiece W are disposed on the work stages S, S', S", respectively. In the present embodiment, the workpiece W is provided with a large number of joining portions to be joined, and the robot systems 1A, 1A', 1A" perform joining work on the joining portions of the workpiece W. However, the robot systems 1A, 1A', 1A" may be configured to perform different types of work on the workpiece W. Although three work stages S, S', S" are illustrated in the illustrated example, the number of work stages provided in the work line 100 may be one, two, or four or more.

The work line 100 is provided with a conveying apparatus 2 for conveying the workpiece W in the conveying direction between two work stages adjacent to each other. The conveying apparatus 2 is, for example, a conveyor. However, the configuration of the conveying apparatus 2 is not particularly limited. For example, the conveying apparatus 2 may be configured to suspend and convey the workpiece W, or may be a carriage type movable in the conveying direction. One conveying apparatus 2 may be provided for two work stages adjacent to each other, or one conveying apparatus 2 may be provided for the entire work line 100.

In the work line 100, for example, in the work stage S', the robot system 1A' performs joining work on a plurality of predetermined joining portions of the workpiece W. When the work by the robot system 1A' is completed, the workpiece W is conveyed by the conveying apparatus 2 to the next work stage S. In the next work stage S, the robot system 1A performs joining work on a plurality of joining portions other than the points joined in the work stage S'. After the work by the robot system 1A is completed, the workpiece W is subsequently conveyed by the conveying apparatus 2 to the next work stage 5". In the work stage 5", the robot system 1A" performs joining work on a plurality of joining portions other than the points joined in the work stages S', S. Thus, while the workpiece W is conveyed in the work line 100, work is sequentially performed on a large number of joining portions of the workpiece W.

Hereinafter, the robot system 1A disposed on the work stage S will be described as an example of a robot system provided in the work line 100.

(Configuration of Robot System)

As illustrated in FIG. 1, the robot system 1A includes two robot arms 4a, 4b and a control device 5 which controls operation thereof. FIG. 2 is a perspective view of the robot system 1A disposed on the work stage S. Further, FIG. 3 is a schematic side view of the robot system 1A as viewed from the downstream side in the conveying direction of the workpiece W. In addition, for simplification, elements which other robot systems 1A', 1A" include are omitted in FIG. 1, and the robot arm 4a on a near side is omitted in FIG. 2.

As illustrated in FIG. 1, in the present embodiment, two robot arms 4a, 4b are respectively disposed on both sides (that is, a near side and a far side) across the conveying path of the workpiece W.

An end effector 47 is attached to a distal end of each robot arm 4a, 4b. The robot arm 4a or 4b, the end effector 47 attached thereto, and the control device 5 that controls operation of the robot arm 4 and the end effector 47 constitute one robot 3 that performs joining work on the workpiece W.

In the present embodiment, a spot welding gun is mounted as an end effector 47 on the distal end of each of the robot arms 4a, 4b so that the robot 3 can execute spot welding work as joining work. However, the joining work performed by the robot 3 is not limited to the spot welding, and may be, for example, friction stir welding, riveting, arc welding, or joining using a screw, a bolt, a nut, or the like.

Since the robot arms 4a, 4b have configurations similar to each other, hereinafter, when collectively referring to the robot arms 4a, 4b, and when a robot arm arbitrarily selected from the robot arms 4a, 4b is described, the alphabetic character of the reference sign is omitted to described it as a robot arm 4.

As illustrated in FIG. 3, the robot arm 4 is an articulated robot arm having a plurality of, or three or more, joints JT1 to JT6, and is configured such that a plurality of links 41 to 46 are sequentially connected. More specifically, at the first joint JT1, a base 48 and a proximal end of the first link 41 are connected to be rotatable about an axis extending in a vertical direction. At the second joint JT2, a distal end of the first link 41 and a proximal end of the second link 42 are connected to be rotatable about an axis extending in a horizontal direction. At the third joint JT3, a distal end of the second link 42 and a proximal end of the third link 43 are connected to be rotatable about an axis extending in the horizontal direction. At the fourth joint JT4, a distal end of the third link 43 and a proximal end of the fourth link 44 are connected to be rotatable about an axis extending in a longitudinal direction of the fourth link 43. At the fifth joint JT5, a distal end of the fourth link 44 and a proximal end of the fifth link 45 are connected to be rotatable about an axis orthogonal to a longitudinal direction of the link 44. At the sixth joint JT6, a distal end of the fifth link 45 and a proximal end of the sixth link 46 are connected to be twistable and rotatable. A mechanical interface is provided at a distal end of the sixth link 46. The end effector 47 is detachably mounted on this mechanical interface.

The joints JT1 to JT6 are each provided with a drive motor (not illustrated) as an example of an actuator that relatively rotates two members which the joint couples. The drive motor is, for example, a servo motor servo-controlled by the control device 5. Further, the joints JT1 to JT6 are each provided with a rotation sensor for detecting a rotational position of the drive motor, and a current sensor for detecting a current for controlling rotation of the drive motor (neither illustrated). The rotation sensor is, for example, an encoder.

The control device 5 includes, for example, an operating unit (not illustrated) constituted of a microcontroller, MPU, Programmable Logic Controller (PLC), a logic circuit, or the like, and a memory unit (not illustrated) constituted of a ROM, a RAM, and/or the like.

Further, as illustrated in FIG. 1, the robot system 1A includes four locators 6a, 6b, 6c, 6d. The locators 6a, 6b, 6c, 6d cooperate one another to position the workpiece W. In the present embodiment, the locator 6a and the locator 6b are disposed to face each other on both sides (that is, the near side and the far side) across the conveying path of the workpiece W. Further, the locators 6c and 6d are disposed on an upstream side in the conveying direction of the locators 6a and 6b, respectively, on both sides (that is, the nearside and the far side) across the conveying path of workpiece W. Further, as illustrated in FIG. 1, in the present embodiment, the robot arm 4a is disposed on the near side of the locators 6a, 6c between the locator 6a and the locator 6c in the conveying direction. Further, the robot arm 4b is disposed on the far side of the locators 6b, 6d between the locator 6b and the locator 6d in the conveying direction.

Since the locators 6a, 6b, 6c, 6d have configurations similar to each another, hereinafter, when collectively referring to the locators 6a, 6b, 6c, 6d, and when a locator arbitrarily selected from the locators 6a, 6b, 6c, 6d is described, the alphabetic character of the reference sign is omitted to describe it as a locator 6.

The locator 6 cooperate one another to support the workpiece W conveyed to the work stage S by the conveying apparatus 2, and positions the workpiece W at a predetermined location where the robot 3 can work. As illustrated in FIG. 3, the locator 6 has a locate pin 64 inserted into a hole h formed in a bottom of the workpiece W. The locator 6 includes a first moving module 61, a second moving module 62, and a third moving module 63 so as to move the locate pin 64 in three axial directions orthogonal to each other, and is configured such that the modules are coupled in this order from a bottom to a top.

More specifically, the first moving module 61 moves the locate pin 64 in a first horizontal direction in parallel to the conveying direction of the workpiece W. The first moving module 61 has a first base member extending in the first horizontal direction, and a first sliding member slidably driven in the first horizontal direction with respect to the first base member. The first base member of the first moving module 61 is fixed on a fixed base (not illustrated).

Further, the second moving module 62 moves the locate pin 64 in a second horizontal direction orthogonal to the conveying direction. The second moving module 62 has a second base member extending in a second horizontal direction, and a second sliding member slidably driven in the second horizontal direction with respect to the second base member. The second base member of the second moving module 62 is fixed on the first sliding member of the first moving module 61.

In addition, the third moving module 63 moves the locate pin 64 in the vertical direction. The third moving module 63 has a third base member extending in the vertical direction, and a third sliding member which is slidably driven in the vertical direction with respect to the third base member. The third base member of the third moving module 63 is provided to stand on the second sliding member of the second moving module 62. A locate pin 64 is fixed vertically upward to the third sliding member.

The locator 6 supports the workpiece W by inserting the locate pin 64 into the hole h of the workpiece W. A support surface that abuts around the hole h of the workpiece W may be provided around a locate pin 64. In addition, the locate pin 64 may have a function of clamping the workpiece W after inserted into the hole h of the workpiece W.

In the present embodiment, in the locator 6, the first moving module 61, the second moving module 62, and the third moving module 63 are disposed in this order from the bottom to the top, but the disposition of the first moving module 61, the second moving module 62, and the third moving module 63 is not particularly limited. Further, the hole h through which the locate pin 64 is inserted may not be provided on the bottom of the workpiece W, and may be provided on a side of the workpiece W, for example. In this case, the locate pin 64 may be disposed to be directed toward the horizontal direction.

The first moving module 61, the second moving module 62, and the third moving module 63 each include a drive motor (not illustrated) for slidingly driving the first sliding member, the second sliding member, and the third sliding member. In the present embodiment, the control device 5 controls operation of not only the robot arm 4 but also the locator 6. That is, the control device 5 can operate the respective drive motors provided in the first moving module 61, the second moving module 62, and the third moving module 63 to arbitrarily change the positions of the locate pins 64. However, the robot arm 4 and the locators 6 may be controlled by separate control devices.

Next, an example of a flow of joining work by the robot system 1A will be described with reference to FIGS. 4A to 6B. Note that operation of the robot arm 4, the end effector 47, and the locator 6 in the joining work is controlled by the control device 5.

FIG. 4A is a schematic side view of the robot system 1A immediately after the workpiece W is conveyed to the work stage S. However, the robot arm 4 is omitted in FIG. 4A for simplification. As illustrated in FIG. 4A, until the workpiece W is conveyed to the work stage S, the locator 6 is in a state that the locate pin 64 is retracted downward so as not to contact the conveyed workpiece W. In the present embodiment, the conveying apparatus 2 conveys the workpiece W to a predetermined position where the locate pin 64 and the hole h into which the locate pin 64 is inserted coincide in the vertical direction.

FIG. 4B is a schematic plan view of the robot system 1A illustrated in FIG. 4A. In FIG. 4B, each of movable ranges Ra, Rb of the robot arms 4a, 4b is illustrated to be surrounded by two-dot chain lines. Here, the movable range Ra, Rb refers to a maximum range in which respective parts (including the end effector 47) of the robot arm 4a, 4b can structurally move. However, when there is an electrical or mechanical stopper within the maximum range of allowing structural movement, the range in which the respective parts of the robot arm 4a, 4b cannot operate due to the stopper is excluded therefrom.

As described later, in the present embodiment, the workpiece W conveyed to the work stage S is first positioned to a first position and then positioned to a second position different from the first position by the locator 6. A point to be joined by the robot arm 4 when the workpiece W is at the first position among the plurality of joining portions included in the workpiece W will be referred to as a first joining portion (first work portion), and a point to be joined by the robot arm 4 when the workpiece W is at the second position among the plurality of joining portions included in the workpiece W will be referred to as a second joining portion (second work portion). In addition, in this embodiment, although there is a plurality of each of the first and second joining portions, there may be one joining portion.

FIG. 5A is a schematic side view of the robot system 1A in which the workpiece W is positioned at the first position. When the conveying apparatus 2 conveys the workpiece W to a predetermined position as illustrated in FIG. 4A, the locator 6 drives the third moving module 63 to insert the locate pin 64 into the hole h of the workpiece W, so as to support the workpiece W as illustrated in FIG. 5A. Thus, the locator 6 positions the position of the workpiece W to the preset first position.

FIG. 5B is a schematic plan view of the robot system 1A illustrated in FIG. 5A. When the workpiece W is positioned at the first position, the robot arm 4 performs joining work on the first joining portion of the plurality of joining portions included in the workpiece W. The first joining portion is within the movable range Ra, Rb of one of the robot arms 4a, 4b when the workpiece W is at the first position. In the present embodiment, the first joining portion is in an area A hatched in FIG. 5B.

FIG. 6A is a schematic side view of the robot system 1A in which the workpiece W is positioned at the second position. After work of the robot arm 4 on the first joining portion is completed at the first position illustrated in FIG. 5A, the locator 6 changes the position of the workpiece W from the first position to the second position while maintaining the state that the locate pin 64 is inserted into the hole h. In the example illustrated in FIGS. 4A to 6B, when work of the robot arm 4 on the first joining portion is completed, the locator 6 drives the first moving module 61 to move the locate pin 64 in the conveying direction (that is, the first horizontal direction), so as to change the position of the workpiece W to the preset second position.

FIG. 6B is a schematic plan view of the robot system 1A illustrated in FIG. 6A. When the workpiece W is positioned at the second position, the robot arm 4 performs joining work on the second joining portion out of the plurality of joining portions included in the workpiece W. The second joining portion is within the movable range Ra, Rb of one of the robot arms 4a, 4b when the workpiece W is at the second position. In the present embodiment, the second joining portion is in an area B hatched in FIG. 6B.

In the present embodiment, when the locator 6 positions the workpiece W at the first position, the second joining portion is outside the movable range Ra, Rb of the robot arm 4. Then, when the locator 6 changes the position of the workpiece W from the first position to the second position, the second joining portion enters the movable range Ra, Rb of the robot arm 4.

As described above, in the present embodiment, the locator 6 changes the workpiece W to the second position after completing work at the first position so that work can be performed on the second joining portion on which it is not physically possible to perform work when the workpiece W is located at the first position.

FIGS. 7A and 7B illustrate another operation example different from the operation example of the robot system 1A illustrated in FIGS. 4A to 6B. The operation example of FIGS. 4A to 6B illustrates an example in which the position of the workpiece W is changed from the first position to the second position by moving the workpiece W in the conveying direction (first horizontal direction). In the operation example of FIGS. 7A and 7B, the position of the workpiece W is changed from a first position to a second position by moving the workpiece W in a direction that is orthogonal to the conveying direction and is horizontal (second horizontal direction).

FIG. 7A is a schematic side view of the robot system 1A in which the workpiece W is positioned at the first position as viewed from the downstream side in the conveying direction of the workpiece W. FIG. 7B is a schematic side view of the robot system 1A in which the workpiece is positioned at the second position as viewed from the downstream side in the conveying direction of the workpiece. In addition, in FIGS. 7A and 7B, the robot arm 4b and the control device 5 on the far side are omitted for simplification.

When the workpiece W is at the first position, a central portion of the workpiece W located near middle portions of the robot arms 4a, 4b may be outside the movable ranges Ra, Rb of both the robot arms 4a, 4b. Further, even when the central portion of the workpiece W is positioned within the movable range Ra or Rb, work by the robot arm 4a or 4b can be difficult to perform. In such a case, as illustrated in FIG. 7B, after work on the first joining portion is completed, the locator 6 drives the second moving module 62 to move the locate pin 64 in the second horizontal direction orthogonal to the conveying direction. Thus, the position of the workpiece W is changed to a preset second position closer to the robot arm 4a as compared to when it is at the second position.

The operation example of the robot system 1A is not limited to the above-described one. For example, the third moving module 63 may be driven to change the position of the workpiece W from the first position to the second position. Also, for example, two or more of the first moving module 61, the second moving module 62, and the third moving module 63 may be driven to change the position of the workpiece W from the first position to the second position. Further, for example, by pivoting the workpiece W by cooperation of the first moving module 61 and the second moving module 62, the position of the workpiece W may be changed from the first position to the second position.

As described above, in the robot system 1A according to the present embodiment, after work of the robot 3 on the first joining portion is completed for the workpiece W having the first and second joining portions, the locator 6 changes the position of the workpiece W to a position for performing work on the second joining portion. Thus, for example, even when the robot 3 cannot perform work on the second joining portion when the workpiece W is at the first position, it is possible to enable the robot 3 to perform work on the second joining portion. Therefore, since the same robot 3 can perform work on the first and second joining portions, work can be completed by a smaller number of robots 3 for the workpiece W having a plurality of joining portions.

Embodiment 2

Next, a robot system 1B according to Embodiment 2 will be described with reference to FIGS. 8A and 8B. FIG. 8A is a schematic side view of the robot system 1B in which a workpiece W is positioned at a first position as viewed from a downstream side in a conveying direction of the workpiece W. FIG. 8B is a schematic side view of the robot system 1B in which the workpiece W is positioned at a second position as viewed from the downstream side in the conveying direction of the workpiece W. In addition, in FIGS. 8A and 8B, the robot arm 4b and the control device 5 on a far side are omitted for simplification.

The robot system 1B according to Embodiment 2 has the same configuration as that of Embodiment 1 except for locators 7 that position the workpiece W. A locator 7 of the robot system 1B includes a locate pin 74 inserted into a hole h formed in a bottom of the workpiece W, and a first moving module 71, a second moving module 72, and a third moving module 73 for moving the locate pin 74 in three axial directions orthogonal to each other, and includes a turning mechanism 75 in addition thereto. The turning mechanism 75 turns the locate pin 74 about a predetermined axis extending in the conveying direction of the workpiece W.

More specifically, the first moving module 71 has a first base member extending in a first horizontal direction in parallel to the conveying direction of the workpiece W, and a first sliding member which is slidably driven in the first horizontal direction with respect to the first base member. The first base member of the first moving module 71 is fixed on a fixed base which is not illustrated. Further, the second moving module 72 has a second base member extending in a second horizontal direction orthogonal to the conveying direction of the workpiece W, and a second sliding member which is slidably driven in the second horizontal direction with respect to the second base member. The second base member of the second moving module 72 is fixed on the first sliding member of the first moving module 71. Further, the third moving module 73 has a third base member extending in a vertical direction, and a third sliding member which is slidably driven in the extending direction with respect to the third base member. The third base member of the third moving module 73 is provided to stand on the second sliding member of the second moving module 72.

The turning mechanism 75 is disposed on the third sliding member of the third moving module 73. The turning mechanism 75 couples a support member 76 and the third sliding member so that the support member 76 supporting the locate pin 74 can turn about a predetermined axis extending in the conveying direction of the workpiece W with respect to the third sliding member.

When the workpiece W is positioned at the first position illustrated in FIG. 8A, when it is attempted to perform joining work, the robot arm 4 may interfere with a part of the workpiece W depending on the joining portion of the workpiece W, and thus cannot perform work. Even in such a case, in the present embodiment, by tilting the workpiece W using the turning mechanism 65, a joining portion (second work portion) at a position where it is not possible to work due to interference with the workpiece W when the workpiece W is at the first position is moved to a position where the robot arm 4 can perform work without interfering with the workpiece W.

Specifically, after work on the first joining portion of the workpiece W located at the first position is completed, the locator 7 tilts the workpiece W toward the robot arm 4a side by cooperation of the second moving module 72, the third moving module 73, and the turning mechanism 75 while keeping the state that the locate pins 74 are inserted into the holes h. Thus, the locator 7 changes the position of the workpiece W from the first position where the joining work cannot be performed on a predetermined position to the second position where joining can be performed on the predetermined position.

Also in this embodiment, the same effect as that of Embodiment 1 can be obtained.

Other Embodiments

The present invention is not limited to the embodiments described above, and various modifications can be made without departing from the scope of the present invention.

For example, in the above embodiments, the robot 3 included in the robot systems 1A, 1B is a robot that performs joining work on a plurality of joining portions, but the work performed by the robot 3 is not limited to this. For example, the robot 3 may perform painting work, application work, inspection work, and the like instead of the joining work.

Further, in the above embodiments, the robot system 1A (or 1B) includes two robot arms 4 and four locators 6 (or 7), but the number of robot arms 4 and the number of locators 6 (or 7) are not limited thereto.

Further, the dispositions of the robot arms 4 and the locators 6 (or 7) are not limited to the dispositions illustrated in the above embodiments. For example, in Embodiment 1, the robot arms 4a, 4b are disposed at the position between the locators 6a, 6c in the conveying direction and at the position between the locators 6b, 6d in the conveying direction, respectively. However, the robot arm 4a may be disposed on the upstream side or downstream side of the locators 6a, 6c in the conveying direction, and the robot arm 4b may be disposed on the upstream side or downstream side of the locators 6b, 6d in the conveying direction.

Moreover, the conveying apparatus 2 may be constituted of two parallel conveyors extended in the conveying direction, and in this case, the locator 6 may be disposed between two conveyors.

In Embodiment 2, the turning mechanism 75 turns the locate pins 74 about the predetermined axis extending in parallel to the conveying direction, but the turning direction of the locate pins 74 is not limited thereto. For example, the turning mechanism 75 may turn about an axis that is perpendicular to the conveying direction and is horizontal. Further, the configuration of the locator 7 is not limited to the one described above. For example, the turning mechanism 75 may be provided between the second moving module 72 and the third moving module 73 so that the third base member of the third moving module 73 can be turned with respect to the second sliding member of the second moving module 72.

REFERENCE SIGNS LIST 1A, 1B robot system
2 conveying apparatus
3 robot
5 control device
6 (6a, 6b, 6c, 6d) locator
61 first moving module
62 second moving module
63 third moving module
64 locate pin
7 (7a, 7b, 7c, 7d) locator
71 first moving module
72 second moving module
73 third moving module
74 locate pin
75 turning mechanism
100 work line
Ra, Rb movable range
S work stage
W workpiece
h hole

The invention claimed is:

1. A robot system for performing work on a workpiece having a plurality of holes and a plurality of work portions, the robot system comprising:
at least one robot configured to perform predetermined work on at least first and second work portions among the plurality of work portions;
a plurality of locators each having a locate pin movable in three axial directions orthogonal to one another, and that are configured to position the workpiece with the locate pins being inserted into the holes at a first position where the robot performs work on the first work portion; and
a control device that controls operation of the plurality of locators and the robot, wherein
each locator includes:
a first moving module that moves the locate pin in a first horizontal direction;
a second moving module that moves the locate pin in a second horizontal direction orthogonal to the first horizontal direction;
a third moving module that moves the locate pin in a vertical direction; and
a rotary joint that couples a second element to a first element in a rotatable manner and rotates the second element with respect to the first element to rotate the locate pin about a predetermined axis extending in a horizontal direction, the first element being one of the first moving module, the second moving module, and the third moving module, the second element being different from the first element and being one of the locate pin, the first moving module, the second moving module, and the third moving module, and
the control device is configured to execute control so as to:
drive at least the third moving module such that a position of the workpiece is at the first position at which the locate pins are inserted into the holes;
operate the robot such that the robot performs work on the first work portion; and
after the work of the robot on the first work portion is completed, control the second moving module, the third moving module, and the active joint to tilt the workpiece while keeping a state that the locate pins are inserted into the holes, so as to change the position of the workpiece from the first position to a second position where the robot performs work on the second work portion.

2. The robot system according to claim 1, wherein by the plurality of locators changing the position of the workpiece from the first position to the second position, the second work portion moves from outside a movable range of the robot to within the movable range of the robot.

3. The robot system according to claim 1, wherein by the plurality of locators changing the position of the workpiece from the first position to the second position, the second work portion moves from a position where work using the robot is not possible due to interference with the workpiece to a position where the robot can work without interfering with the workpiece.

4. The robot system according to claim 1, wherein
the workpiece is a vehicle body of an automobile having a plurality of joining portions as the plurality of work portions or a part constituting a portion of the vehicle body, and
the robot is a robot that is configured to perform joining on the first and second work portions.

5. A work line provided with a plurality of work stages where predetermined work is performed on a workpiece along a conveying path of the workpiece, wherein
the workpiece has first and second work portions, and
the work line comprises:
the robot system according to claim 1, disposed in at least one of the plurality of work stages; and
a conveying apparatus that is configured to convey the workpiece between two work stages adjacent to each other of the plurality of work stages.

6. The robot system according to claim 1, wherein
the locate pins face upward, and the control device is configured to drive the third moving module such that the locate pins are inserted into the holes from below.

7. The robot system according to claim 1, wherein
the plurality of locators include a first locator including a first locate pin, which is one of the locate pins, and a second locator including a second locate pin, which is another one of the locate pins, and
the control device is configured to control the second moving module, the third moving module, and the rotary joint to tilt the workpiece in a direction from the first locate pin toward the second locate pin, so as to change the position of the workpiece from the first position to the second position where the robot performs work on the second work portion.

8. A robot system for performing work on a workpiece having a plurality of holes and a plurality of work portions, the robot system comprising:
at least one robot configured to perform predetermined work on at least first and second work portions among the plurality of work portions;
a plurality of locators each having a locate pin movable in three axial directions orthogonal to one another, and that are configured to position the workpiece with the locate pins being inserted into the holes at a first position where the robot performs work on the first work portion; and
a processor that controls operation of the plurality of locators and the robot, wherein
each locator includes:
a first drive motor that moves the locate pin in a first horizontal direction;
a second drive motor that moves the locate pin in a second horizontal direction orthogonal to the first horizontal direction;
a third drive motor that moves the locate pin in a vertical direction; and
a rotary joint that couples a second element to a first element in a rotatable manner and rotates the second element with respect to the first element to rotate the locate pin about a predetermined axis extending in a horizontal direction, the first element being one of the first drive motor, the second drive motor, and the third drive motor, the second element being different from the first element and being one of the locate pin, the first drive motor, the second drive motor, and the third drive motor, and
the processor is configured to execute control so as to:
drive at least the third drive motor such that a position of the workpiece is at the first position at which the locate pins are inserted into the holes;
operate the robot such that the robot performs work on the first work portion; and
after the work of the robot on the first work portion is completed, control the second drive motor, the third drive motor, and the rotary joint to tilt the workpiece while keeping a state that the locate pins are inserted into the holes, so as to change the position of the workpiece from the first position to a second position where the robot performs work on the second work portion.

* * * * *